(12) United States Patent
McCabe

(10) Patent No.: US 6,625,665 B1
(45) Date of Patent: Sep. 23, 2003

(54) COMMAND INTERPRETATION SYSTEM AND METHOD

(75) Inventor: Daniel H. McCabe, Bellevue, WA (US)

(73) Assignee: S3 Graphics Co., Ltd., Grand Cayman (KY)

( * ) Notice: Subject to any disclaimer, the term of this patent is extended or adjusted under 35 U.S.C. 154(b) by 0 days.

(21) Appl. No.: 09/492,967

(22) Filed: Jan. 27, 2000

(51) Int. Cl.⁷ .................................................. G06F 3/00
(52) U.S. Cl. .............................. 710/5; 710/7; 710/30; 710/61
(58) Field of Search ............................. 710/5, 6, 30, 61

(56) References Cited

U.S. PATENT DOCUMENTS

| | | |
|---|---|---|
| 4,238,893 A | 12/1980 | Komatsubara et al. |
| 5,661,665 A | 8/1997 | Glass et al. |
| 5,701,511 A | 12/1997 | Smith |
| 6,002,720 A | 12/1999 | Yurt et al. |
| 6,157,634 A | 12/2000 | Mehta et al. |
| 6,215,798 B1 * | 4/2001 | Carneheim et al. ......... 370/515 |

* cited by examiner

Primary Examiner—Jeffrey Gaffin
Assistant Examiner—Eron Sorrell
(74) Attorney, Agent, or Firm—Carr & Ferrell LLP

(57) ABSTRACT

A processing system is disclosed. The processing system processes a plurality of commands for a peripheral system. A command source generates at least a first command stream and a second command stream. A portion of the peripheral system is responsive to the second command stream and the entire processing system is responsive to the first command stream. The processing system includes a command segregation module that receives the plurality of commands from the command source. The command segregation module also segregates each command into the first command stream and the second command stream and inserts synchronization commands into the first command stream. The processing system also includes a command integration module that receives the first command stream and the second command stream. The command integration module integrates the first command stream having the synchronization commands and the second command stream so that there is a single, linearized command stream. One or more execution modules of the processing system may now execute the linearized command stream. A method for processing a plurality of command streams is also disclosed.

16 Claims, 7 Drawing Sheets

COMMAND INTERPRETATION SYSTEM AND METHOD

BACKGROUND OF THE INVENTION

1. Field of the Invention

The present invention relates to a command interpretation system, and more particularly, to a synchronous command interpretation system and method.

2. Description of the Related Art

Processing commands in a data processing system can be accomplished by using one or more command interpretation systems or command processing machines. Each set of commands is typically associated with a particular command interpretation system. Further, each set of commands is typically processed sequentially by its associated command interpretation system.

In some instances, the two sets of commands in the data processing systems need to be processed in parallel with one another. Moreover, the two sets of commands may be required to interact, e.g., a foreground command processing machine that processes commands must switch to a background command processing machine that processes commands before the foreground command processing machine continues processing its commands. In such instances, the command processing machines must be properly synchronized.

Data processing systems synchronize the two command processing machines through the use of co-routines. The co-routines are commands that are inserted into both the foreground command stream and the background command stream. The co-routine commands provide addressing information on where to return processing to in the command stream that currently is not processing.

For example, if a foreground command processing machine must execute four foreground commands, followed by two background commands, before continuing with three foreground commands, a co-routine must be added to the foreground command stream after the four foreground commands and a co-routine must be added to the background command stream after the two background commands. Each co-routine includes information on where to begin processing in the command processing machine that is not currently active. Thus, using co-routines, the two command processing machines are able to process the foreground and background command streams in parallel.

There are, however, drawbacks to the data processing systems using the co-routine approach. Co-routines are not efficient because of the amount of information necessary to provide to a command processing machine before actually beginning processing. Further, co-routines work only with a single pair of command processing machines.

Co-routines are impractical for situations involving the synchronization of more than one foreground command processing machine because the co-routines do not provide an adequate structure for determining the processing order for each of the different command processing machines. For example, co-routines do not provide a structure for synchronizing operation of the background command processing machines with multiple foreground command processing machines.

In sum, current data processing systems are inadequate for handling complex data command streams that require that the use of multiple command processing machines which increase overall command processing throughput.

Therefore, there is a need for a new command processing system and method that (1) allows for the use of multiple foreground command processing machines with a background command processing machine that (2) maintains common representation of the background command processing machine while (3) increasing command processing throughput in a data processing system.

SUMMARY OF THE INVENTION

A command processing system processes multiple commands in a peripheral system. The commands are from one or more command sources. At least one command source generates one or more local commands for a portion of the peripheral system. Another command source generates global commands for the entire peripheral system.

The command processing system includes a command segregation module and a command integration module. The command segregation module is coupled to receive local and global commands from the command sources. The command segregation module is coupled to the command integration module. The command integration module is coupled to a command decoder. The command decoder is coupled to one or more execution modules.

The command segregation module segregates the commands it receives from the command sources into at least one local command stream and a global command stream. The command segregation module inserts synchronization commands into each of the local command streams. The command segregation module then generates one or more linearized local command streams and a linearized global command stream.

The command integration module receives the linearized local command streams and the linearized global command stream. The command integration module integrates the linearized local command streams with the linearized global command stream. The command integration module generates a single integrated command stream that is sent to the command decoder. The command decoder forwards the integrated command stream to an appropriate execution module for execution.

In one embodiment of the present invention, a process includes receiving a plurality of commands for a peripheral system from a command source. The process segregates the plurality of commands into at least a first command stream and a second command stream. For example, in a graphics peripheral system, a first command stream is associated with the portion of a display region and a second command stream associated with the entire display region. The process interleaves the second command stream with at least one point of the first command stream. Specifically, the process inserts a synchronization command into the first command stream at each point with which it is to be interleaved with the second command stream. The synchronization commands include information to resume execution of the first command stream. The plurality of command streams are then interleaved into a single, linearized command stream. This linearized command stream is now ready for execution by one or more execution modules in the peripheral system.

The present invention includes a system and a method that advantageously allows for processing a global command stream and one or more logical command streams together rather than individually. The present invention beneficially includes a system and a method that takes an application command stream, segregates the global command stream and the one or more local command streams, synchronizes all of the command streams, and then interleaves the command streams together into a single, logical, integrated command stream for execution (or processing). The integrated command stream generated by the present invention advantageously allows for asymmetrical processing such that the global command stream can complete processing without requiring additional information related to the processing of the one or more local command streams. These features increase processing efficiency and speed because all of the command streams may be processed within a single, logical, integrated command stream without requiring any one particular command stream to be completely processed before beginning processing of another command stream.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE PREFERRED EMBODIMENTS

A preferred embodiment of the present invention will be described with reference to the Figures, where like reference numbers may indicate identical or functionally similar elements. The present invention includes a system and a method for processing multiple data streams.

Figure 1A:
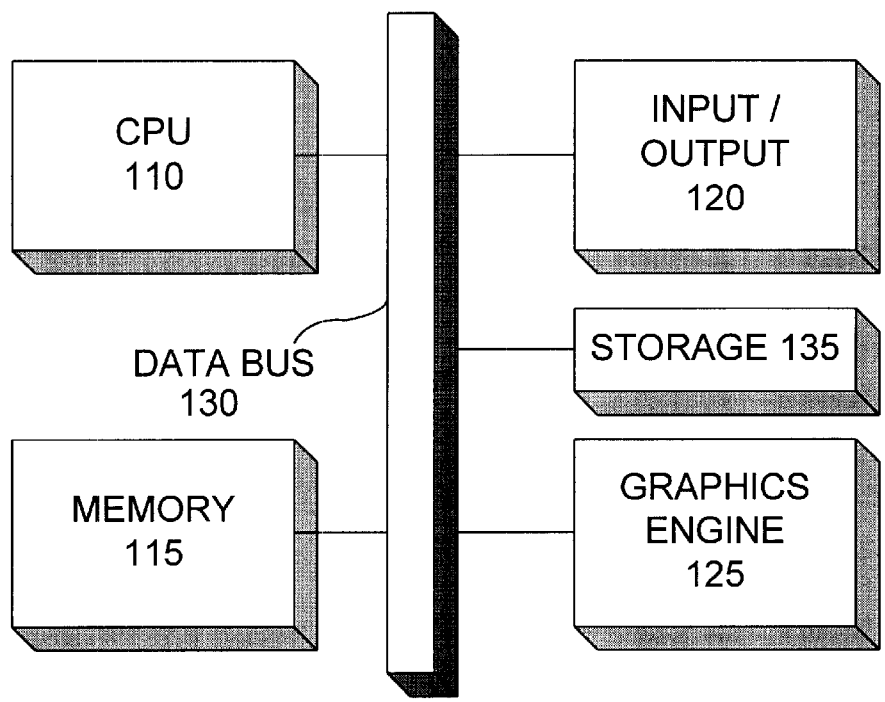
FIG. 1a illustrates a first embodiment of a data processing system in accordance with the present invention.

FIG. 1a illustrates a first embodiment of a data processing system 101 in accordance with the present invention. The data processing system 101 includes data processing components, for example, a processor or central processing unit ("CPU") 110, a memory 115, an input/output interface 120, and a data bus 130. The data processing system 101 may also include a peripheral device engine, for example, a graphics engine 125. The CPU 110, the memory 115, the input/output interface 120, and the graphics engine 125 are coupled through the data bus 130. The data processing system 101 may also include a conventional data storage device 135, e.g., disk drive, CD-ROM, flash storage device, or tape drive. The data storage device 135 also couples with the data bus 130. The data storage device may be read by the processor 110.

The CPU 110 is a conventional central processing unit that issues and processes instructions. The memory 115 is a conventional memory that stores data. The memory 115 can be read by the processor (CPU) 110. The input/output interface 120 is a conventional interface for coupling to an input and/or output device that communicates with the components of the data processing system 101. It is noted that in an alternative embodiment the input/output interface 120 may be integrated with the input and/or output device. The peripheral device engine may be any peripheral device that processes local (or foreground) and global (or background) command streams for the peripheral device, as is further described below. For example, the graphics engine 125 is a graphics engine that processes graphics command streams in accordance with the present invention. The data bus 130 is a conventional data bus that transmits data and instructions between the components of the data processing system 101.

Figure 1B:
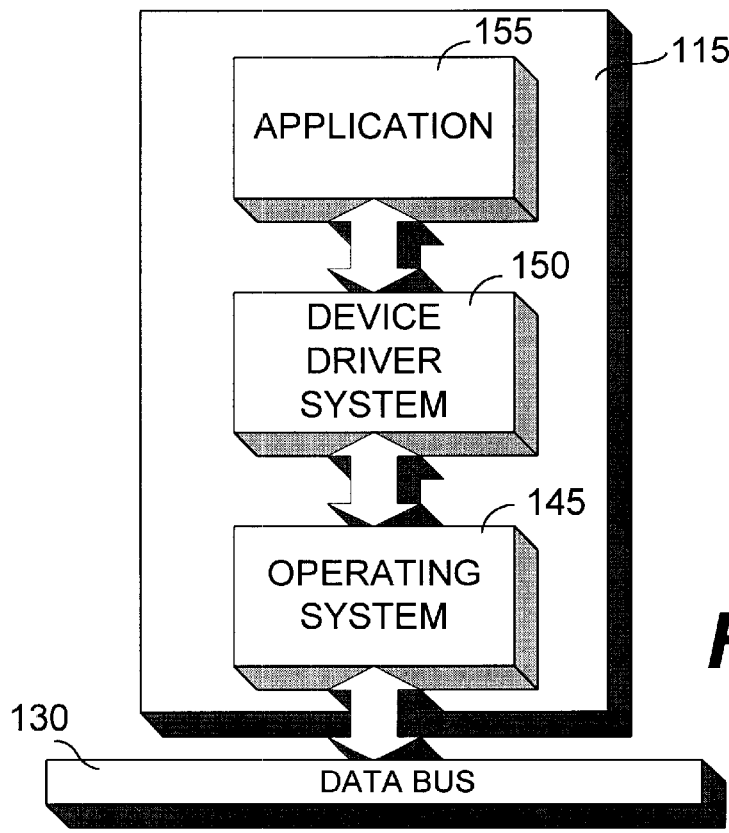
FIG. 1b illustrates a second embodiment of a data processing system in accordance with the present invention.

FIG. 1b illustrates one embodiment of a second embodiment of a data processing system 102 in accordance with the present invention. The second embodiment of the data processing system 102 may operate in conjunction with the first embodiment of the data processing system 101 illustrated in FIG. 1a. The second embodiment of the data processing system 102 includes at least a portion of an operating system 145, at least a portion of a device driver system 150, and at least a portion of an application 155. The operating system 145, the device driver system 150, and the application 155 may be resident in the memory 115, which is coupled to the data bus 130. The device driver system 150 is coupled to the operating system 145 and the application 155. The operating system 145 is coupled with the data bus 130.

The operating system 145 is a conventional operating system that interacts with the processor 110 to process the instructions. The device driver system 150 is a device driver system that processes command streams, e.g., graphics command streams, in accordance with the present invention. The application 155 may be a conventional application that issues application command streams, e.g., graphics command streams, for processing. The application command streams include local (or foreground) and global (or background) command streams, as is further described below.

Generally, in one embodiment, the application 155 issues application command streams for processing. The application command streams are received by the device driver system 150. The device driver system 150 pre-processes the application command streams and passes the pre-processed application command streams for the graphics engine 125. The graphics engine 125 further processes the pre-processed application command streams for execution or in preparation for execution.

Figure 2:
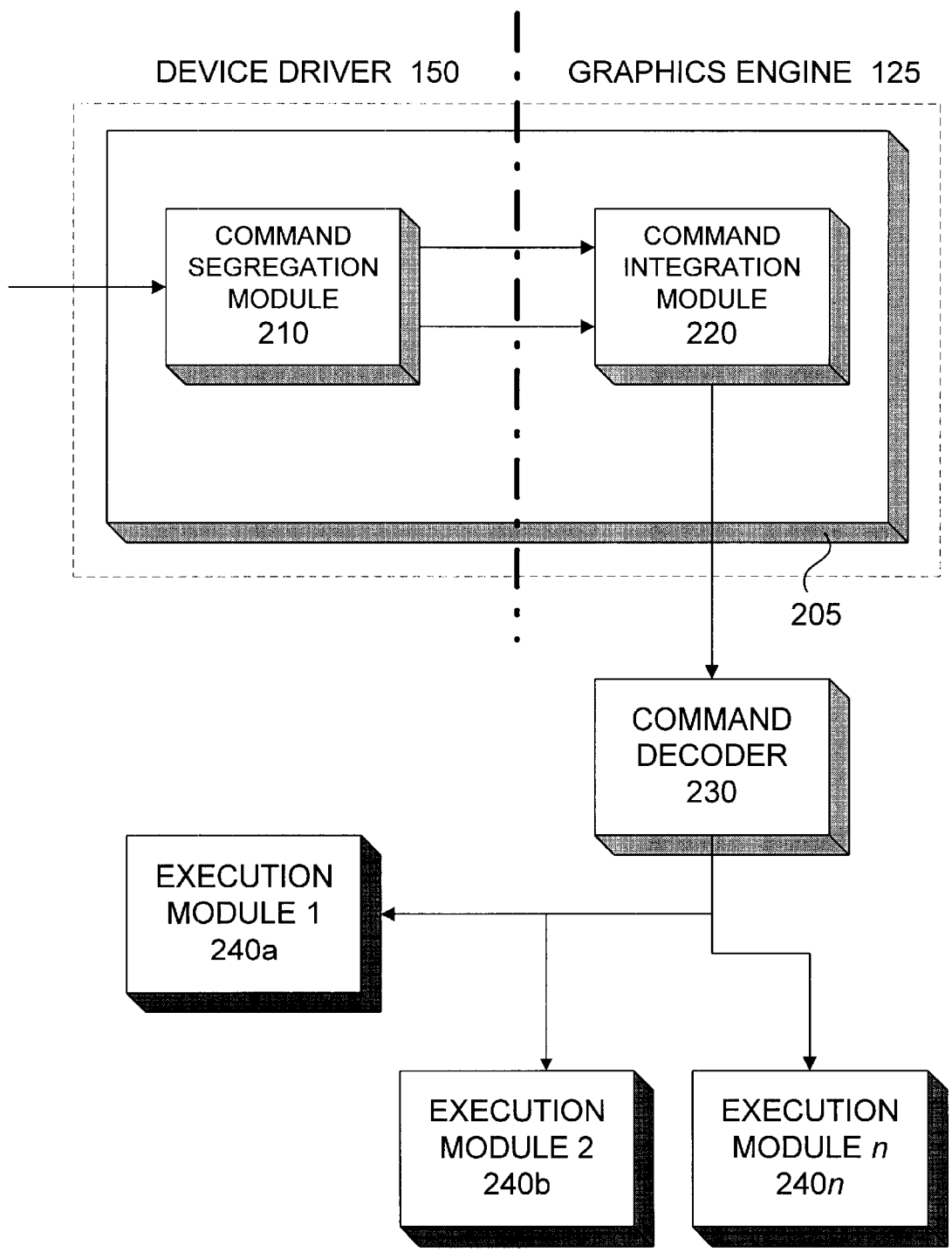
FIG. 2 illustrates one embodiment of a command processing system in accordance with the present invention.

FIG. 2 illustrates one embodiment of a command processing system 205 in accordance with the present, invention. The command processing system 205 may include at least a portion of the device driver system 150 and at least a portion of the graphics engine 125. Specifically, the command processing system 205 includes the command segregation module 210 and the command integration module 220. In a preferred embodiment, the command segregation module 210 is embodied in software and the command integration module 220 is embodied in hardware. It will be appreciated by those skilled in the art that the functionality of the command segregation module 210 may also be embodied in hardware or a combination of hardware and software. Thus, all or a portion of the command segregation module 210 may reside in the memory 115 and may be executed by the processor 110. It will also be appreciated by those skilled in the art that the functionality of the command integration module 220 may also be embodied in hardware or a combination of hardware and software. Thus, all or a portion of the command integration module 220 may reside in the memory 115 and may be executed by the processor 110.

The command segregation module 210, which may be included in the device driver system 150, is coupled to receive the application command streams from, for example, the application 155. The command segregation module 210, which may be included in the peripheral device engine, e.g., the graphics engine 125, is coupled to the command integration module 220. The command integration module 220 is also coupled to a command decoder 230 that, in turn, is coupled to one or more execution modules, e.g., 240a, 240b, 240n.

In one embodiment, the application command streams from the application 155 are received through the memory 115. The command segregation module 210 pre-processes the application command streams. Specifically, the command segregation module 210 separates the application command stream into two or more command streams. The segregation module 210 inserts synchronization commands into at least one of the two or more command streams. The synchronization commands are used to synchronize an order of execution between the two or more command streams. The two or more command streams are then forwarded to the command integration module 220. In one embodiment the two or more command streams are forwarded to the command integration module 220 through the memory 115.

The command integration module 220 processes the pre-processed application command stream. Specifically, in one embodiment, the command integration module 220 receives the two or more command streams of the pre-processed application command stream from the command segregation unit 210 through the memory 115. The command integration module 220 processes the two or more command streams to generate a single, integrated command stream for the command decoder 230. The command decoder 230 issues the integrated command stream for execution by an execution module, e.g., 240a, 240b, 240n of a peripheral system. The single, integrated command stream advantageously increases peripheral system processing efficiency and speed because multiple command streams can process simultaneously. That is, rather than delaying execution of a command stream until one or more other command streams complete processing, multiple command streams are advantageously processed together.

Figure 3A:
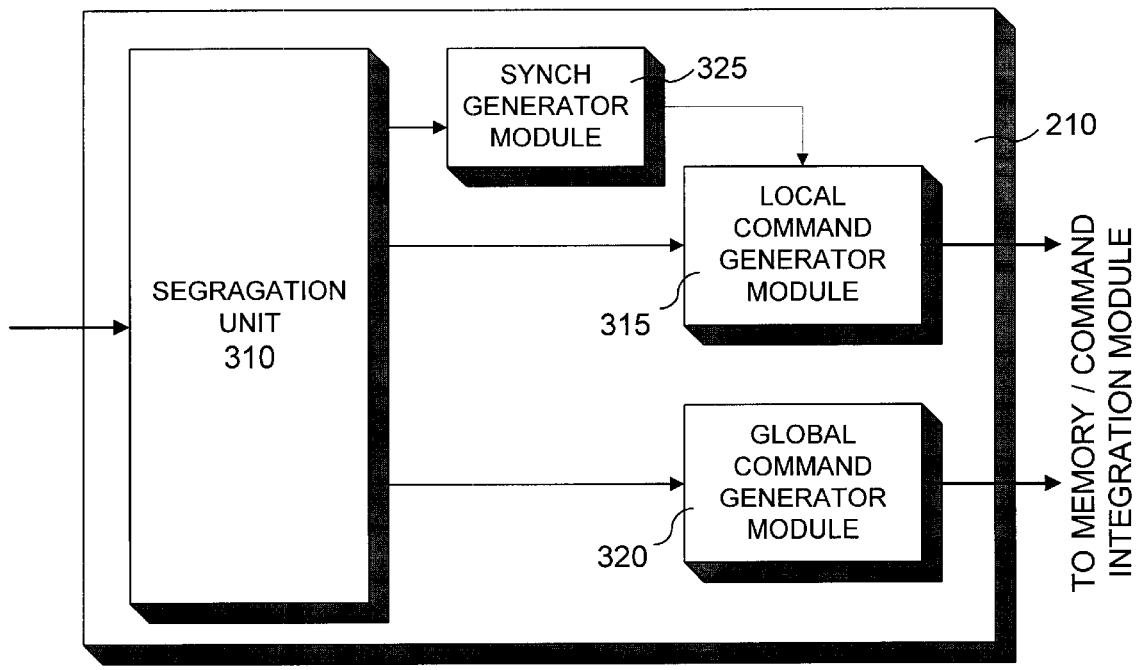
FIG. 3a illustrates one embodiment of a command segregation module in accordance with the present invention.

FIG. 3a illustrates one embodiment of the command segregation module 210 in accordance with the present invention. The command segregation module 210 includes a segregation unit 310, a local command generator module 315, a global command generator module 320, and a synch generator module 325. The segregation unit 310 is coupled to receive an application command stream from, for example, the application 155. The segregation unit 310 is coupled to the local command generator module 315, the global command generator module 320, and the synch generator module 325.

The synch generator module 325 is coupled to the local command generator module 315. The local command generator module 315 and the global command generator module 320 are coupled to the command integration module 220. In one embodiment the local command generator module 315 and the global command generator module 320 are coupled to the memory 115 that is coupled to the command integration module 220.

When the command segregation unit 310 receives application command streams from, for example, the application 155, the command segregation unit 310 segregates, or separates, the application command streams into two or more command streams. In one embodiment, one command stream is a global (or background) command stream and one or more of the other command streams is a local (or foreground) command stream. In peripheral device systems such as graphics systems, the global command stream is, for example, a command stream that includes information (or data) related to color, line style, texture maps, or other non-geometric properties of primitives. A local command stream is, for example, a command stream that includes information (or data) related to line co-ordinates, texture co-ordinates, or other geometric properties of primitives.

The segregation unit 310 passes the local command stream (or streams) to the local command generator module 315. The segregation unit 310 passes the global command stream to the global command generator module 320. The segregation unit 310 also triggers the synch generator module 325 to generate synchronization (or "synch") commands that are passed to the local command generator module 315. The synch commands are inserted into the local command stream. The synch commands are used to synchronize all of the local command streams with the global command stream.

The global command generator module 320 generates (or outputs) a global command stream. The local command generator module 315 generates (or outputs) one or more local command streams with synch commands. Both the outputted global command stream and the outputted local command streams are sent to the command integration module 220 for further processing. In an alternative embodiment, the global and local command streams may be sent to the memory 115 before further processing, for example, by the command integration module 220 or the processor 110.

Figure 3B:
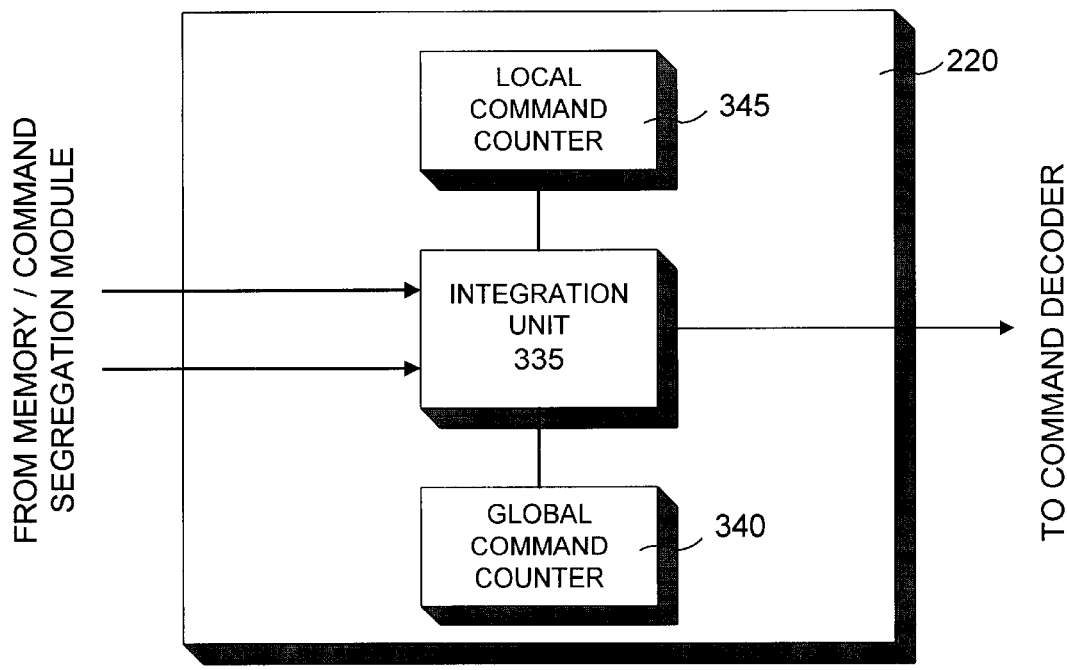
FIG. 3b illustrates one embodiment of a command integration module in accordance with the present invention.

FIG. 3b illustrates one embodiment of the command integration module 220 in accordance with the present invention. The command integration module 220 includes an integration unit 335, a global command counter 340, and a local command counter 345. The integration unit 335 receives and integrates the global command stream and the one or more local command streams. The global command counter 340 keeps track of the number of global commands to process in the global command stream before switching to a local command stream. The local command counter 345 keeps track of the number of local commands to process in the local command stream before switching to another local command stream or to the global command stream.

During operation, the command integration module 220 receives both the global command stream and the one or more local command streams from the memory and/or the command segregation module 210. More particularly, the integration unit 335 receives the command streams. As the integration unit 335 receives each command stream, the global command counter 340 and the local command counter 345 keep track of the number of commands that must be processed by a particular command stream before passing control to another command stream or streams.

Using the information from the global command counter 340 and the local command counter 345, the integration unit 335 integrates, or interleaves, the global command stream with the one or more of the local command streams. The integration unit 335 then generates a single, integrated command stream that may be output to the command decoder 230 for further processing. Alternatively, the integrated command stream maybe stored in the memory 115 before further processing, for example, by the command decoder 230.

The integrated command stream now is a single command stream that is ready for execution. In addition, the single, integrated command stream includes a particular processing order for ensuring that all of the command streams are properly processed in order. This processing order advantageously increases system efficiency and speed because each command is instantaneously processed when fetched rather than having to wait until additional information is received from a command not yet processed.

Figure 4A:
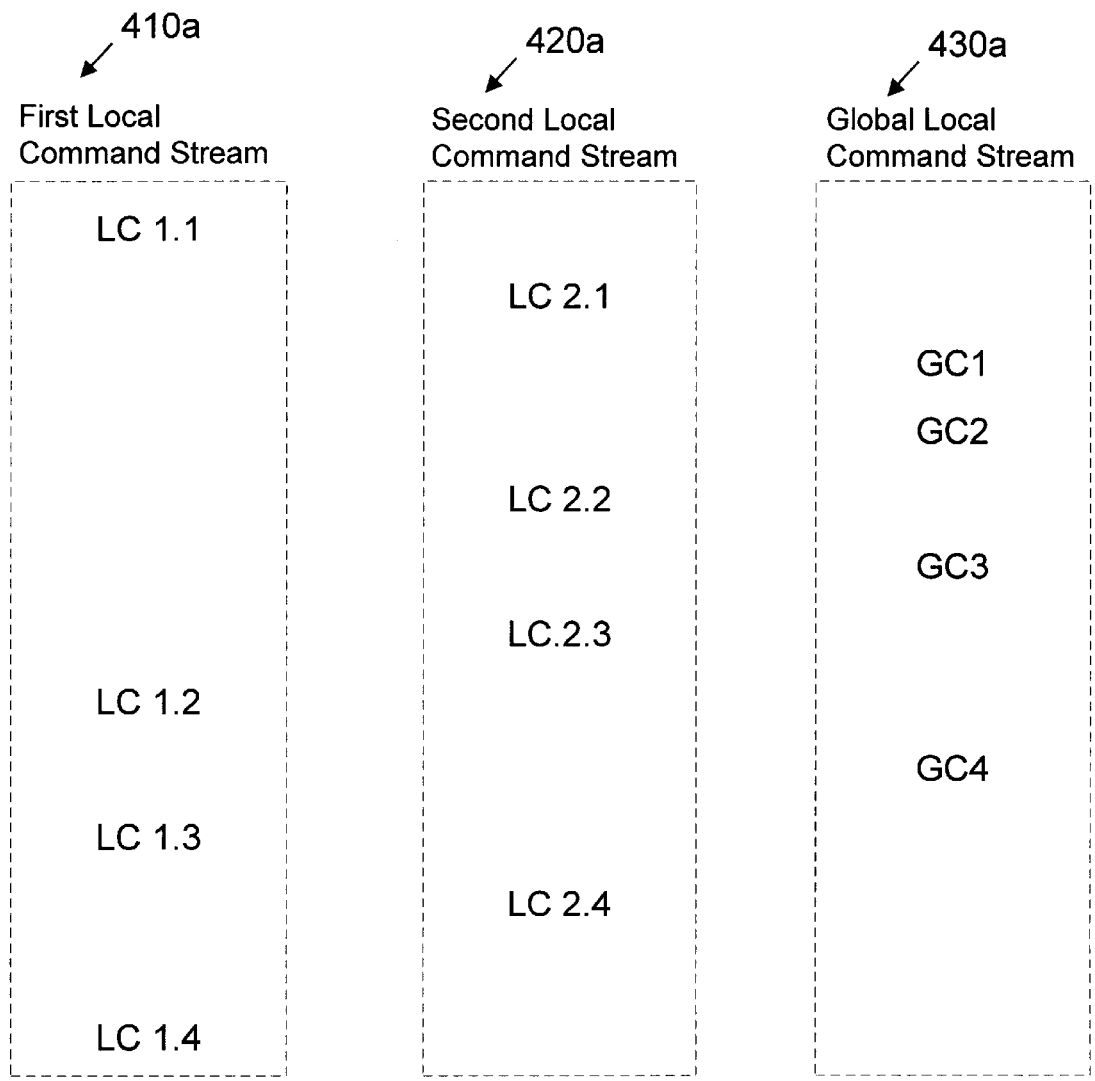
FIGS. 4a and 4b illustrate one embodiment of an example for having one or more local command streams synchronized with respect to a global command stream in a local command generator module and a global command generator module in a command segregation module in accordance with the present invention.
Figure 4B:
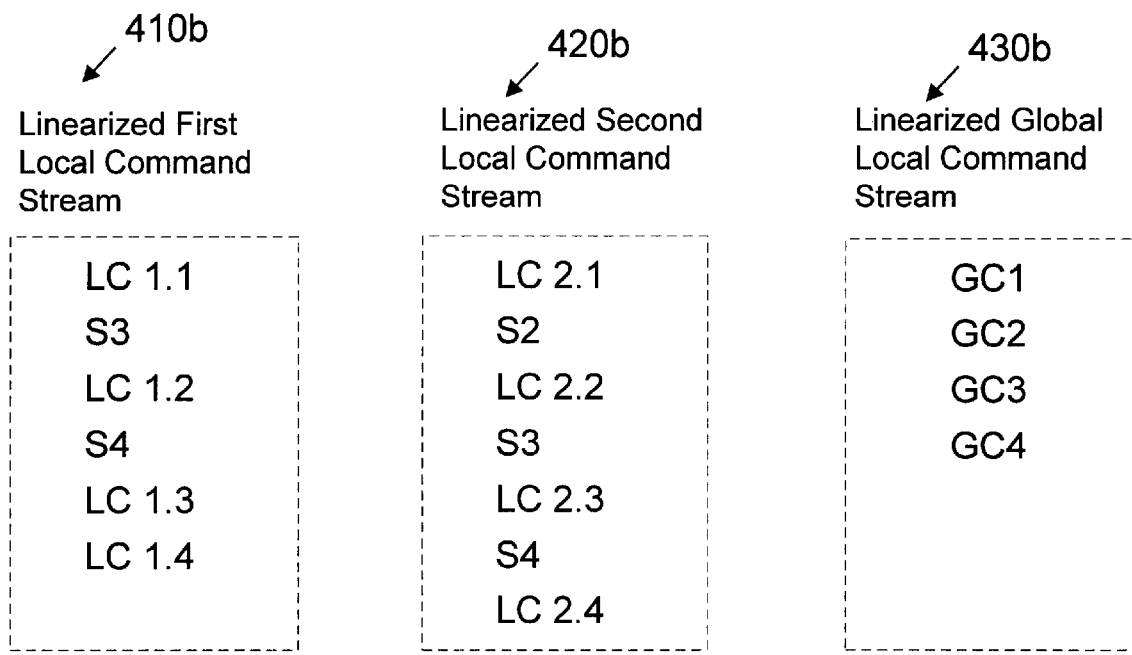

FIGS. 4a and 4b illustrate one embodiment of an example for having one or more local command streams synchronized with respect to a global command stream in the local command generator module 315 and the global command generator module 320 in the command segregation module 210 in accordance with the present invention. For this example, the segregation unit 310 receives an application command stream that includes two sets of local commands and a set of global commands. The application command stream includes, for example, GC 1, LC 1.1, LC 2.1, LC 2.2, LC 1.2, LC 1.3, GC 2, LC 2.3, GC 3, GC 4, LC 2.4, LC 1.4.

FIG. 4a illustrates the three command streams 410a, 420a, 430a that the segregation module separates out from the application command stream. The first local command stream 410a includes four local commands, specifically, LC 1.1, LC 1.2, LC 1.3, and LC 1.4. The second local command stream 420a includes four other local commands, specifically, LC 2.1, LC 2.2, LC 2.3, and LC 2.4. The global command stream 430a includes four global commands, specifically GC 1, GC 2, GC 3, and GC 4. Both the first and the second local command streams 410a, 420a are received by the local command generator module 315.

FIG. 4b illustrates a first synchronized local command stream 410b and a second synchronized local command stream 420b generated by the local command generator module 315 and a global command stream 430b generated by the global command generator module 320. Synch commands are inserted into both the first and the second synchronized local command streams in locations where the first and the second synchronized local command stream should continue processing after a particular global command stream has completed processing.

For example, the first local command stream processes the first local command, LC 1.1. Thereafter, the first local command stream will not process the second command, LC 1.2, in the first local command stream until after the first three global commands, GC 1, GC 2, and GC 3, are processed. Therefore, the synch generator module 325 inserts the synch command, S3, before the second command, LC 1.2, in the first local command stream. The synch command, S3, serves as a synchronization marker to inform the first local command stream to begin processing the second local command, LC 1.2, in the first local command stream only after the third global command, GC 3, completes processing. The synch generator module 325 also inserts a synch command, S4, before the third command, LC 1.3, of the first local command stream so that the third command, LC 1.3, begins processing only after the fourth global command, GC 4, completes processing.

Similarly, the synch generator module 325 inserts synch commands into the second local command stream. Specifically, synch commands, S2, S3, and S4, are inserted before the second command, LC 2.2, in the second local command stream, the third command, LC 2.3, in the second local command stream, and the fourth command, LC 2.4, in the second local command stream. Thus, the second command, LC 2.2, will not be processed until after the second global command, GC 2, completes processing, the third command, LC 2.3, will not be processed until after the third global command, GC 3, completes processing, and finally, the fourth command, LC 2.4, will not be processed until after the fourth global command, GC 4, completes processing.

Inserting the synchronization commands generated by the synch generator module 325 into the local command streams helps build two separate linearized command streams in the memory 115. Specifically, the local command generator module 315 generates a linearized first local command stream 410b and a linearized second local command stream 420b that is forwarded to the memory 115. The memory 115 forwards the linearized first and second local command streams 410b, 420b to storage for saving or to the command integration module 220 for further processing.

Figure 5:
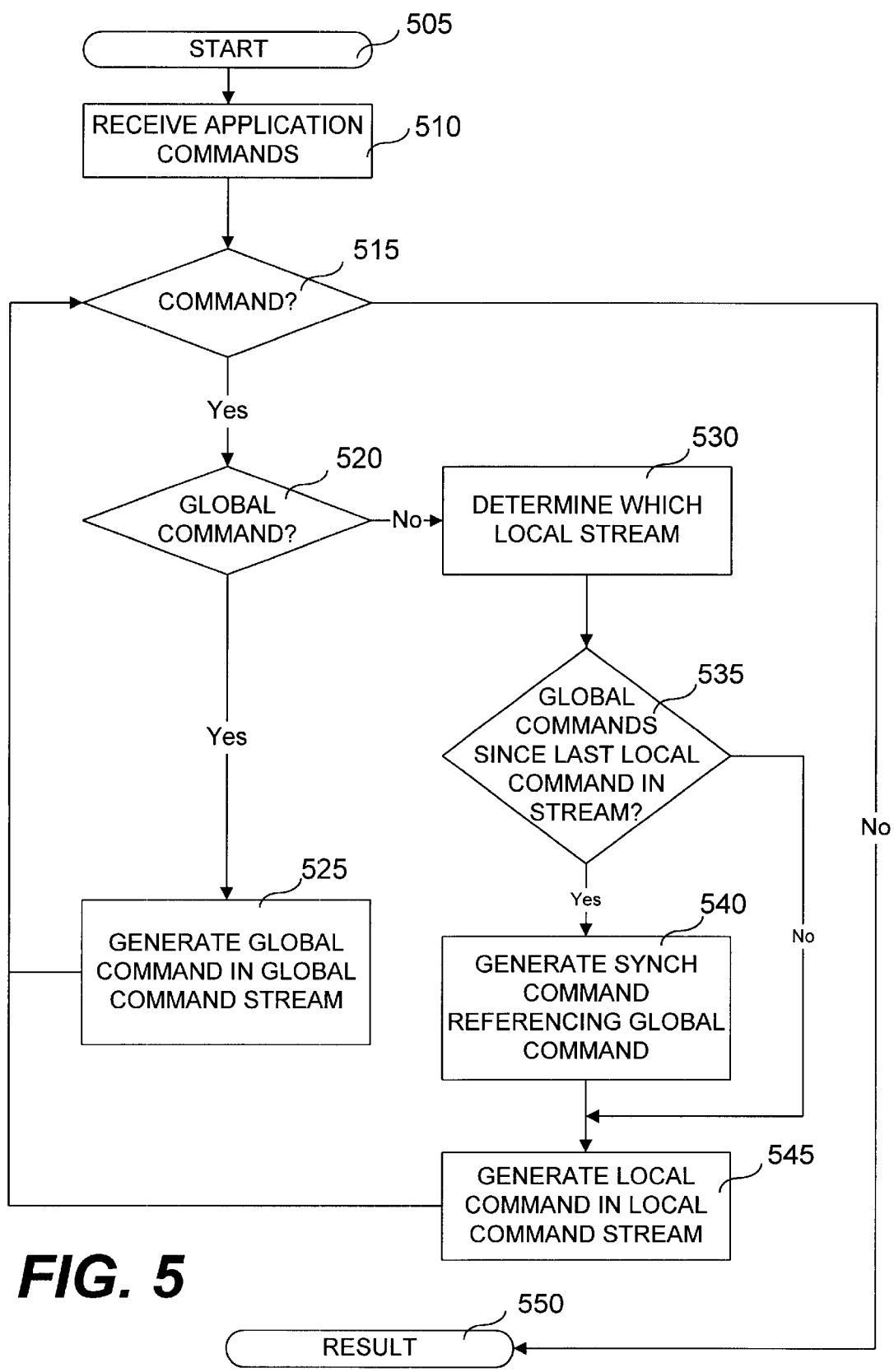
FIG. 5 illustrates a flow diagram of one embodiment of a process for synchronizing local and global command streams in the command segregation module in accordance with the present invention.

FIG. 5 illustrates a flow diagram of one embodiment of a process for synchronizing local and global command streams in the command segregation module 210 in accordance with the present invention. Once the process starts 505, the segregation unit receives 510 application command streams from, for example, a graphics-type application. The segregation unit 310 looks at the application command streams and determines 515 if commands were received. If a command from the application command stream is received 515, the segregation unit 310 determines 520 whether that command is a global command or a local command. If the command is a global command, the segregation unit 310 sends the command to the global command generator module 320 to generate a global command in the global command stream. The process continues with the segregation unit 310 determining 515 whether it received another command from the application command stream.

If the segregation unit 310 determines 520 that the received command is not a global command, it is identified as a local command. The segregation unit 310 determines 530 in which local command stream to place the local command and passes the local command to the local command generator module 315. The segregation unit 310 determines 535 whether there have been any global commands since the last local command in the application command stream.

If there has been a global command since the last local command in the application command stream, the synch generator module 325 generates 540 a synch command referencing the global command. The synch command is inserted into the local command stream having the current local command. If there has been no global command since the last local command in the application command stream, no synch command is generated. The local command generator module 315 generates the local command stream having the current local command and, if necessary, the synch command.

The process continues with the segregation unit 310 determining 515 whether it received another command from the application command stream. If so, the process continues as described above. If the segregation unit 310 determines 515 that no more commands are present in the application command stream, the result 550 is that the application command stream is now segregated into a global command stream and one or more local command streams.

The process is now ready to integrate the global command stream with the one or more local command streams in the command integration module 220. The command integration module 220 integrates the various command streams by interleaving them into a single, logical, integrated command stream that includes the global command stream and the one or more local command streams. The integrated command stream can be forwarded to the memory, the command decoder, or other processing subsystem for further processing by, for example, an execution module, e.g., 240*a*, 240*b*, 240*n*.

Figure 6:
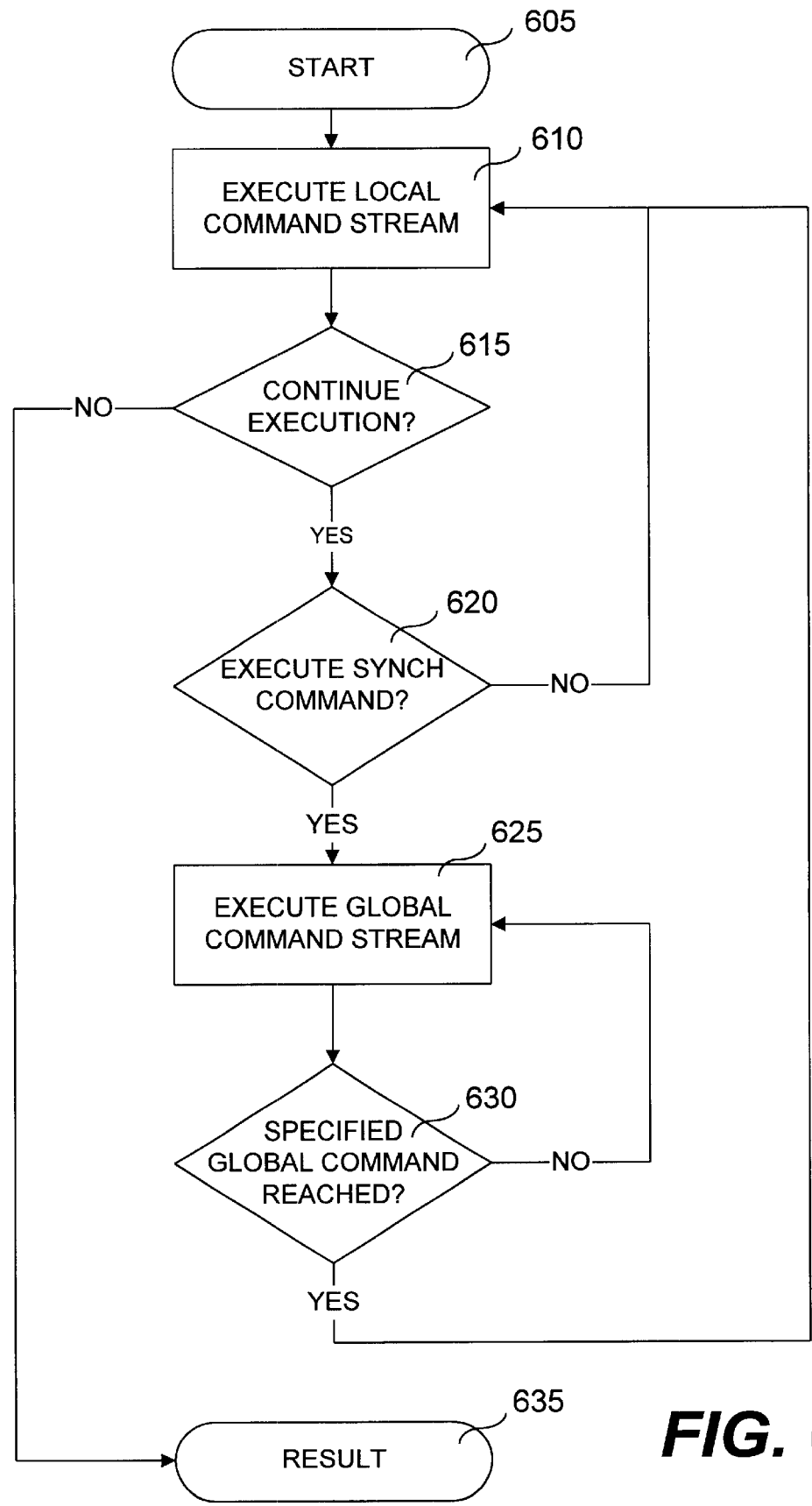
FIG. 6 illustrates a flow diagram of one embodiment for executing an integrated command stream having synchronized local and global command streams in accordance with the present invention.

FIG. 6 illustrates a flow diagram of one embodiment for executing an integrated command stream having synchronized local and global command streams in, for example, an execution module, e.g., 240*a*, 240*b*, 240*n*, in accordance with the present invention. The process starts 605 with the execution module, e.g., 240*a*, executing 610 a local command stream within the integrated command stream. The process determines 615 whether execution should continue. If execution should continue, the process determines 620 whether a synch command has been executed. If no synch command is executed, the process continues with executing 610 the local command stream.

If a synch command is executed, the process has the execution module 240*a* execute 625 a global command stream. The process determines 630 whether a specified global command is reached. The specified global command is the global command identified in the synch command as the point at which to resume processing of the local command stream. If the specified global command is not yet reached, execution 625 of the global command stream continues. If the specified global command is reached, execution 610 of the local command stream resumes. Once the process determines 615 that there are no more commands to continue execution, the result 635 is the execution of the integrated command stream is completed.

The present invention advantageously allows for processing a global command stream and one or more logical command streams together rather than individually. The present invention beneficially includes a system and a method that takes an application command stream, segregates the global command stream and the one or more local command streams, synchronizes all of the command streams, and then interleaves the command streams together into a single, logical, integrated command stream for execution (or processing).

The integrated command stream generated by the present invention advantageously allows for asymmetrical processing such that the global command stream can complete processing without requiring additional information related to the processing of the one or more local command streams. These features increase processing efficiency and speed because all of the command streams may be processed within a single, logical, integrated command stream without requiring any one particular command stream to be completely processed before beginning processing of another command stream.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A processing system for processing a plurality of commands for a peripheral system, the peripheral system responsive to a second command stream representing the peripheral system and to a first command stream representing a portion of the peripheral system, the processing system comprising:

a command segregation module, coupled to receive the plurality of commands from a command source, the command segregation module for segregating each command to the first command stream and the second command stream and for inserting synchronization commands into the first command stream; and a command integration module, coupled to receive the first command stream and the second command stream, for integrating the first command stream having the synchronization commands and the second command stream interleaving the second command stream with at least one point of the first command stream.

2. The processing system in claim 1, wherein the command integration module further comprises:

a first command counter;

a second command counter; and an integration unit, coupled with the first command counter and the second command counter, for interleaving the first command stream and the second command stream in an integrated command stream having a processing order.

3. The processing system in claim 1, wherein the synchronization commands include information for resuming processing of the first command stream.

4. The processing system in claim 1, wherein the command segregation module comprises a segregation unit, coupled to receive the plurality of commands, for separating the plurality of commands into the first command stream and the second command stream.

5. The processing system in claim 4, wherein the command segregation module further comprises a synch generator module, coupled to the segregation unit, for inserting the synchronization commands into the first command stream.

6. The processing system in claim 5, wherein the command segregation module further comprises a first command generator module, coupled to the segregation unit and the synch generator module, for generating the first command stream having the synchronization commands.

7. The processing system in claim 6, wherein the command segregation module further comprises a second command generator module, coupled to the segregation unit, for generating the second command stream.

8. A computer readable medium including a computer program to execute commands of a first processing machine having a first command stream and a second processing machine having a second command stream by performing the steps of:

segregating the plurality of commands into a first command stream and a second command stream, the first command stream associated with a portion of a peripheral subsystem and the second command stream associated with the peripheral subsystem overall;

interleaving the second command stream with at least one point of the first command stream; and inserting a synchronization command into the first command stream at each point interleaved with the second command stream, the synchronization command including information for resuming execution of the first command stream.

9. The computer readable medium to execute commands in claim 8, further performing the steps of:

executing the first command stream until an inserted synchronization command is executed;

executing the second command stream in response to the executed synchronization command; and resuming execution of the first command stream in response to the information in the synchronization command.

10. In a graphics processing system including an entire display region having at least one portion, a method for processing a plurality of commands associated with a portion and with the entire display region, the method comprising:

segregating the plurality of commands into a first command stream and a second command stream, the first command stream associated with the portion of the display region and the second command stream associated with the entire display region;

interleaving the second command stream with at least one point of the first command stream; and inserting a synchronization command into the first command stream at each point interleaved with the second command stream, the synchronization command including information for resuming execution of the first command stream.

11. The method in claim 10 further comprising:

executing the first command stream until an inserted synchronization command is executed;

executing the second command stream in response to the executed synchronization command; and resuming execution of the first command stream in response to the information in the synchronization command.

12. The method of claim 10, wherein segregating the plurality of commands further comprises:

identifying each command as a graphics primitive or a set state;

associating a command with the first command stream in response to the command being identified with the graphics primative; and associating a command with the second command stream in response to the command being identified with the set state.

13. A method in claim 12, wherein the graphics primative is associated with the portion of the display region.

14. The method in claim 12, wherein the set state is associated with the display region.

15. The method in claim 10, wherein executing the first command stream further comprises incrementing a program counter associated with the first command stream until the inserted synchronization command is executed.

16. The method in claim 15, wherein resuming execution of the first command stream further comprises resuming incrementing the program counter.

* * * * *